United States Patent [19]

Karlin et al.

[11] Patent Number: 5,192,905
[45] Date of Patent: Mar. 9, 1993

[54] CHARGING VOLTAGE CONTROL AND CURRENT LIMIT FOR BATTERY CHARGERS

[75] Inventors: Richard A. Karlin, Chicago, Ill.; Hussein I. Bittar, Dearborn, Mich.

[73] Assignee: MagneTek, Inc., Los Angeles, Calif.

[21] Appl. No.: 763,630

[22] Filed: Sep. 23, 1991

Related U.S. Application Data

[63] Continuation-in-part of Ser. No. 634,093, Dec. 24, 1990.

[51] Int. Cl.$^5$ .................................................. H02J 1/04
[52] U.S. Cl. .................................................. 320/23; 320/39
[58] Field of Search .................. 320/20, 21, 22, 23, 320/24, 31, 32, 39, 40, 17, 18

[56] References Cited

U.S. PATENT DOCUMENTS

| | | | |
|---|---|---|---|
| 3,816,806 | 6/1974 | Mas | 320/20 |
| 3,864,617 | 2/1975 | Smith et al. | 320/23 |
| 3,900,784 | 8/1975 | Seike | 320/39 X |
| 4,209,736 | 6/1980 | Reidenbach | 320/22 |
| 4,233,553 | 11/1980 | Prince, Jr. et al. | 320/23 |
| 4,243,929 | 1/1981 | Lenart | 320/23 |

*Primary Examiner*—Steven L. Stephan
*Assistant Examiner*—Kristine Peckman
*Attorney, Agent, or Firm*—Faegre & Benson

[57] ABSTRACT

Charging voltage and current control circuits for battery chargers provide for a constant output voltage above a predetermined value of charging current and a step-wise increased output voltage below the predetermined value of charging current. The charger makes use of a pulse-width modulated control circuit utilizing a variable duty cycle to control charging current and couples a trim command signal responsive to a primary side signal representative of charging current to the pulse-width modulator for values below the predetermined value of charging current. A current limit control circuit provides a foldback current limit function by driving the pulse-width modulator to a reduced output current during overload conditions.

22 Claims, 5 Drawing Sheets

CHARGING VOLTAGE CONTROL AND CURRENT LIMIT FOR BATTERY CHARGERS

CROSS REFERENCE TO RELATED APPLICATION

This is a continuation-in-part of the co-pending application for CHARGING VOLTAGE CONTROL CIRCUIT FOR BATTERY CHARGERS, Ser. No. 07/634,093, filed Dec. 24, 1990.

BACKGROUND OF THE INVENTION

This invention relates to the field of battery chargers, more particularly those chargers using current mode pulse-width modulated (PWM) control systems having a variable duty cycle to control output voltage and charging current.

The sensing of output current in order to both limit it to some maximum desired value and to adjust the output voltage are known in the prior art. The use of output voltage information to cause current limit foldback is also well known. Such techniques have been used in linear power supply design, and were accomplished by conductive connection to the output terminals.

Unlike linear practice where an isolating output line transformer is used, in the design of switched-mode type supplies the regulating element is ordinarily conductively connected to the power input mains. In switching practice, the regulating element, specifically the switch, is often electrically isolated from the output.

Some switcher art has taught the isolation of the switcher control circuits from the actual switcher element such as by using gate driving transformers and then connecting all of the switcher circuitry to the output side. This makes it possible to use control signals directly electrically connected to the output terminals to provide regulation, voltage adjustment, and current limiting and foldback functions. However, with such an approach it is much more difficult to power up (bootstrap) because there is no power on the output side to start the switcher when the circuit is first turned on. Circuits must be added to supply startup power to the output side.

It has been discovered that various switching parameters present at the switcher or input (the primary side of the isolation transformer) side can be used to control the output in a desired manner. In particular, instantaneous output current can be determined from instantaneous primary current. Similarly, average output current can be determined from time-average-integrated instantaneous primary current.

To completely charge a lead acid battery to the maximum possible charge without damaging the battery requires 14.2 volts (for a nominal 12 volt battery). Appliances and light bulbs designed for use on lead-acid battery powered systems, such as vehicles, are typically designed for voltages from 12 to 13.6. Higher voltages seriously shorten the life of such light bulbs and other items. Therefore, it is desirable that a power converter designed for vehicular light bulbs and appliances produce a voltage of 14.2 under light loads such as an ampere or two, thus assuring that a battery can be fully charged overnight, yet adjust its output voltage to 13.6 (or less) volts under heavier loads, thus providing power at a proper voltage to lights and other appliances, as well as charging the lead acid battery to just below a full charge, ready for final "trickle charging."

It is to be understood that under ideal conditions the charger will provide more than 13.6 volts only when no load other than the battery is on the system.

It is desirable to sense the current to cause this adjustment in the primary of a switching converter, because the secondary currents reach levels such as 50 amperes and sensing such high currents is uneconomical of both components and power. Further, resistive sensing is preferred for minimum cost and smallest size. The voltage adjustment must, however, be made at the secondary side of the isolation transformer, because the voltage comparison for the regulating feedback loop takes place at the secondary and is preferably coupled to the primary through an opto-isolator.

Under short circuit output conditions the pulse width becomes very small (a very short "ON" time) in order to keep the current from rising above the desired current limit. Under short circuit, no power is being delivered to the load, so the only power required to maintain the current at limit is to overcome internal losses. In the embodiment disclosed, the parasitic resistances are very low, which is another way of saying the circuit is very efficient, so a narrow pulse will provide sufficient energy to maintain current at the limit value.

It has been discovered that in the case of short circuit, the narrow pulse width by definition requires a very small duty cycle, typically less than 10 percent ON time and over 90 percent OFF time. This causes the output current, which will be the short circuit limit current, to flow in rectifying diodes for about 10 per cent of the time, and to flow in free-wheeling diodes for about 90 per cent of the time. This places the free-wheeling diodes under a heavy stress.

This heavy stress is avoided by another aspect of the present invention wherein the current is reduced to a level well below the full-load or maximum value under conditions of short circuit.

SUMMARY OF THE INVENTION

In a first aspect, the present invention uses a comparator to compare the time-averaged integral of the voltage at a current sense resistor with a fixed voltage reference so that when the current exceeds some value (such as three amperes) the comparator will switch, shunting the main output voltage feedback resistor, lowering the output voltage to provide the desired adjustment. Positive feedback is provided to create a hysteresis. This prevents the voltage from hunting or chattering.

In a second aspect of the present invention, the current limit control must be applied to the PWM circuit, which is referenced to line potential, while the output voltage is a floating potential. This prevents a simple connection to the output to cause the current limit to foldback by making the current limit reference a function of the output voltage.

It has been discovered that the desired foldback can be achieved by using the pulse output of the pulse-width modulator as part of the current limit comparator reference voltage. When the pulse output is time-average integrated, the resulting smoothed signal is substantially independent of line voltage, because the pulse output voltage varies directly with line voltage, while the pulse output width varies inversely with line voltage. Hence, the time-average integrated value, the area under the pulse, is substantially time independent. The time-average integrated value will, however, vary proportionally to pulse width when the pulse width varies in response to load changes, tending toward zero as the pulse output width tends toward zero. It is to be understood that pulse width may also vary in response to line voltage changes without the time-average integrated value changing substantially.

DETAILED DESCRIPTION

Figure 1:
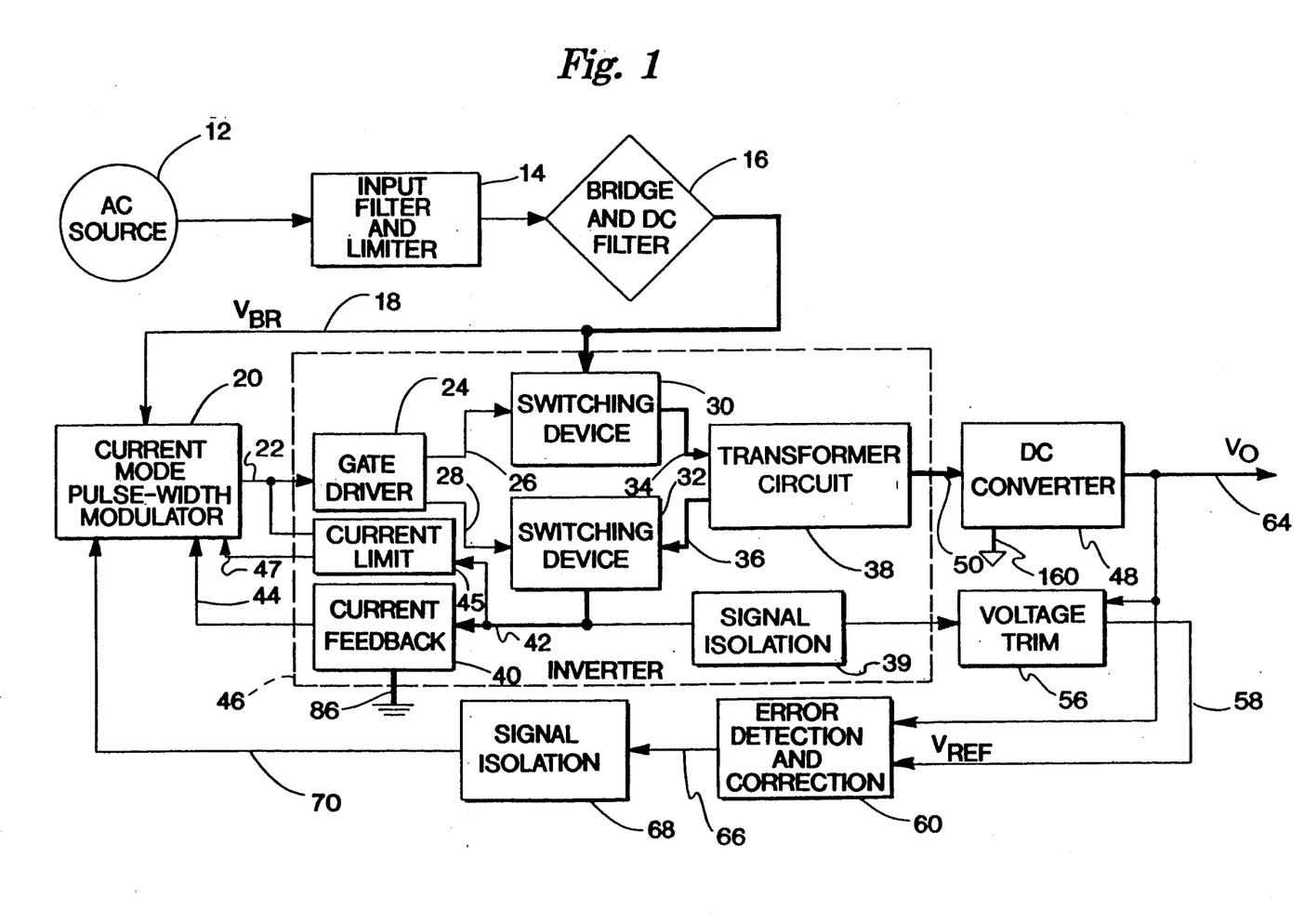
FIG. 1 shows a block diagram of a battery charger utilizing the present invention.

Referring now to FIG. 1, a block diagram of a battery charger 10 may be seen. Charger 10 is preferably connected to an AC source 12 and preferably has a conventional EMI input filter meeting FCC class B specifications. Charger 10 further has a voltage limiter 14 and conventional bridge and DC filter 16. The bridge and DC filter 16 provide a rectified and filtered DC supply 18 on line $V_{BR}$. In a preferred embodiment, supply 18 is 150 volts DC, with the minus side serving as input circuit common 86 for a current mode pulse-width modulator 20 and an inverter 46 of the charger 10 in a manner well known.

Current mode pulse-width modulator 20 supplies a pulse-width modulation signal on line 22 to a gate driver 24. Gate driver 24 supplies separate gate drive signals 26, 28 respectively to a pair o switching devices 30, 32 driven simultaneously and operating in a forward configuration through lines 34, 36 with transformer circuit 38.

A current feedback circuit 40 senses inverter current flowing through lines 34, 36 and 42 and provides a current feedback signal on line 44 to modulator 20. A signal isolation circuit 39 provides an isolated current signal to a voltage trim circuit 56.

A current limit circuit 45 receives the current signal on line 42 and the PWM signal on line 22 and provides a current limit signal on line 47 to the pulse-width modulator 20. The current limit circuit 45 will limit output charging current through control of PWM 20 via line 47 when output charging current exceeds a predetermined value. It is to be understood that the reference value for current limit is compared to the current signal on line 42 and the current limit circuit 45 will prevent output current from exceeding the limit value. In addition, the current limit circuit is capable of differentiating between load impedances, i.e., whether the current limit is at or near a "normal" full-load level (e.g. approximately 0.25 ohms) or whether it is at short circuit conditions. In the event of short circuit conditions, the current limit circuit 45 will reduce the current to approximately 50% of rated current to reduce the stress on the free wheeling diodes 174 (see FIG. 4).

Gate driver 24, switching devices 30, 32, transformer circuit 38 and current feedback and limit circuits 40, 45 together make up a relatively high frequency inverter 46 which powers a DC converter 48 through line 50. It is to be understood that line 50 is powered by a secondary winding in circuit 38, thus providing for an isolated output with an isolated output circuit common 160. DC converter 48 provides the main output $V_O$ 64 of charger 10. It is to be understood that line 64 is preferably adapted to be connected to an automotive-type lead-acid 12 volt storage battery (not shown). The output 64 of converter 48 is used by voltage trim circuit 56 to provide a $V_{REF}$ output on line 58, which is supplied to an error detection and correction circuit 60, along with the $V_O$ voltage on line 64.

Circuit 60 provides an error signal 66 which is isolated by a signal isolation means 68 from the load side of the converter 10 (i.e., on the secondary side or downstream of transformer circuit 38). An isolated error signal is provided on line 70 to modulator 20.

Figure 2:
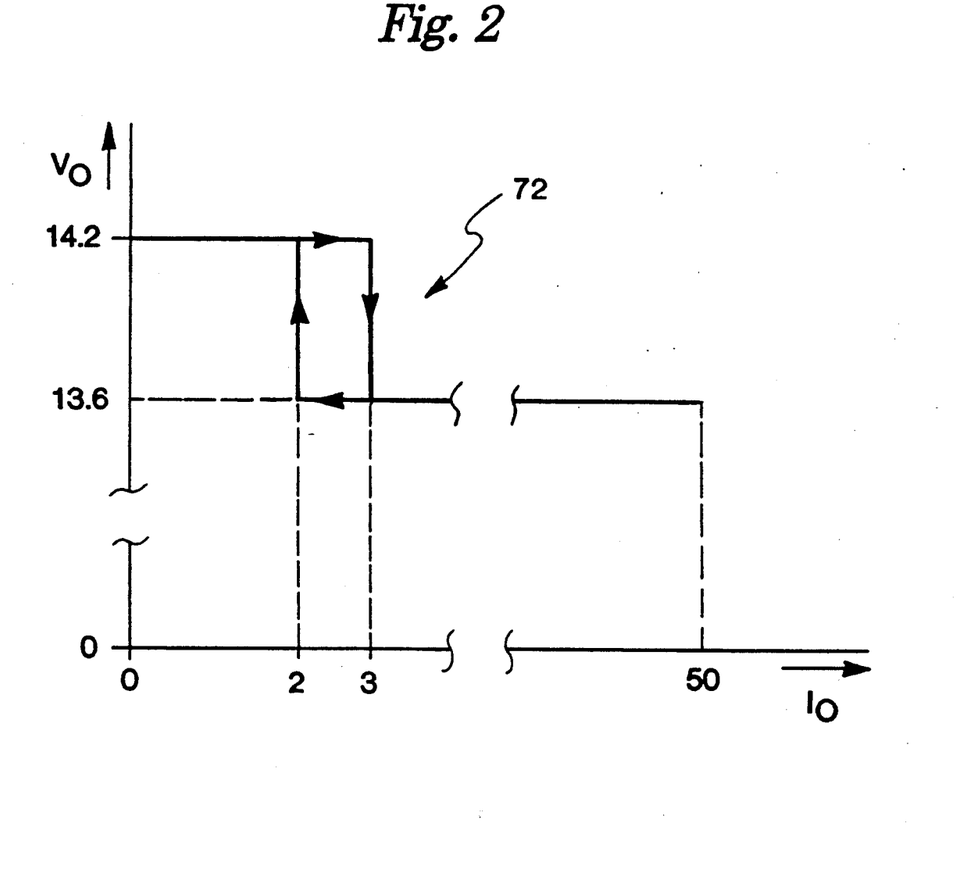
FIG. 2 shows a transfer characteristic relating charging current and charging voltage for the battery charger utilizing the present invention.

Referring now to FIG. 2, a transfer characteristic 72 relating charging current and charging voltage may be seen. The output charging volta $V_O$ is preferably held at 13.6 volts when output charging current $I_O$ is in a range between a predetermined value preferably 2 amperes, and a full load value such as 50 amperes.

It has been found desirable to increase the charging voltage when the charging current is in a range below the predetermined value, preferably below 2 amperes. The present invention accomplishes an automatic adjustment of charging voltage from 13.6 volts to 14.2 volts as the charging current decreases below 2 amperes. In the embodiment shown, the output or charging voltage increases to 14.2 volts as the charging current decreases below 2 amperes. For charging currents below 2 amperes, the charging voltage is held at substantially 14.2 volts. It has been found desirable to have hysteresis in the output voltage characteristic such that with increasing output current, the output voltage will switch from 14.2V to 13.6V at an offset value, for example, of 3 amperes, while with decreasing output current the output voltage will switch back to 14.2 volts at, for example, 2 amperes.

Above the maximum value of output charging current, preferably 50 amperes, a "foldback" current limiting effect is provided, as described below.

Figure 3:
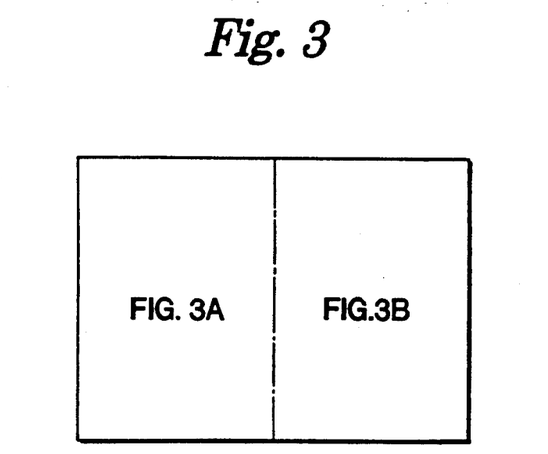
FIG. 3 is a key for FIGS. 3A and 3B.
Figure 3A:
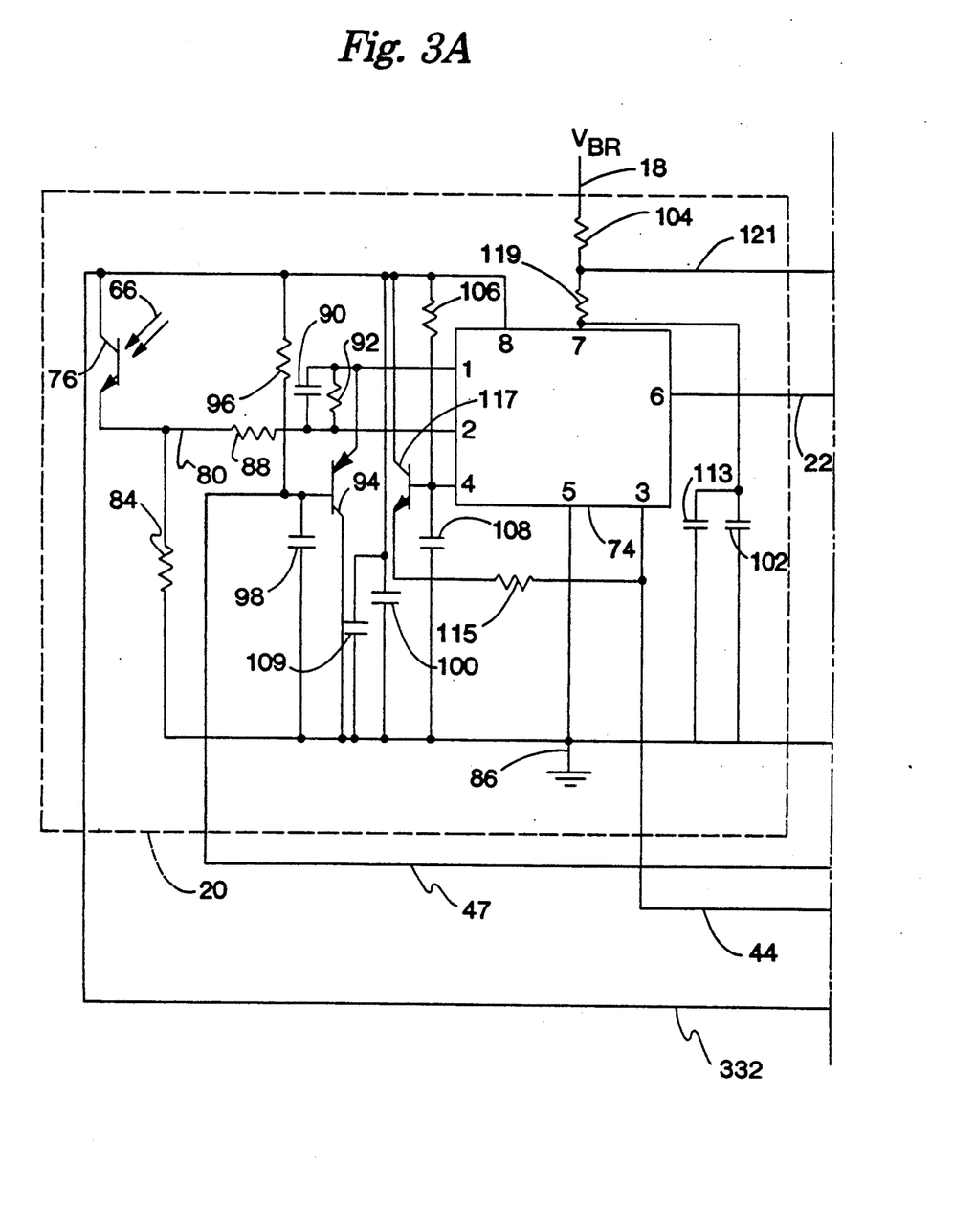
FIG. 3A shows a detailed electrical schematic of current mode pulse-width modulator and a part of the signal isolation portion of the battery charger utilizing the present invention.
Figure 6:
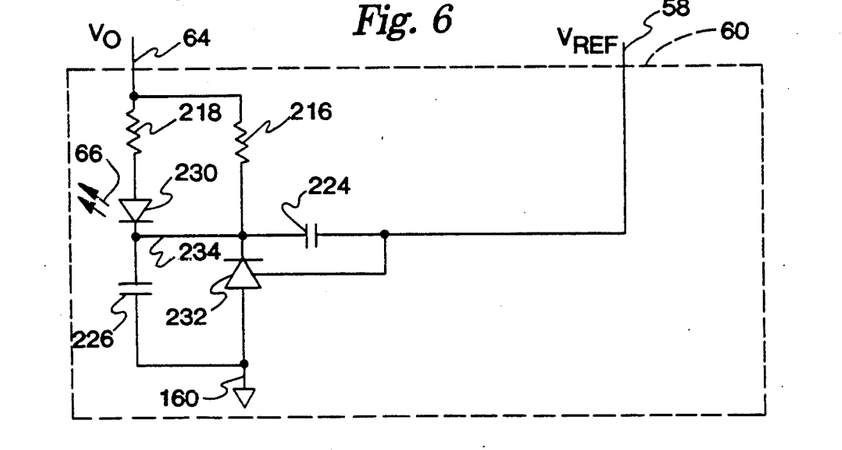
FIG. 6 shows the error detection and correction portion and a part of another signal isolation portion of the battery charger of FIG. 1 utilizing the present invention.

Referring now to FIG. 3A, the circuit details of modulator 20 may be seen. Modulator 20 preferably includes a pulse-width modulation integrated circuit 74 such as a type 2844 as manufactured by SGS Thompson. Integrated circuit or chip 74 has supporting circuitry as follows: a type Hl1A1opto isolator as manufactured by Motorola forms signal isolation means 68. The signal isolation means or opto isolator 68 has an opto-transistor 76 receiving feedback signal 66 on line 70 (see FIG. 1) to control modulation. Referring now also to FIG. 6, signal 66 is provided by opto diode 230 which is also part of the Hl1A1opto isolator 68. The duty cycle control line 80 has a 3.3K ohm resistor 84 connected between it and input circuit common 86. It is to be understood that input circuit common 86 is effective for circuitry on the input or supply side of transformer circuit 38. It is also to be understood that input circuit common 86 and $V_{BR}$ 18 are preferably connected across the output of bridge and DC filter 16. A 10K ohm summing resistor 88 is connected between duty cycle control line 80 and the inverting input or terminal 2 of chip 74. A 0.001 uf capacitor 90 and a 13K ohm resistor 92 are connected between the inverting terminal 2 and the compensation terminal 1 of chip 74.

A 2N2907 type transistor 94 is preferably connected between terminal 1 of chip 74 and input circuit common 86. A 56K ohm resistor 96 and a 10 uf capacitor 98 provide a base network for transistor 94. As will be described below, current limit circuit 45 is connected to the base of transistor 94 to provide for a current limiting input through line 47. A 0.1 uf capacitor 100 and a 10 uf capacitor 109 are preferably connected between terminal 8 and terminal 5 of chip 74. A 0.1 uf capacitor 102 is similarly connected in parallel with a 220 uf capacitor 113 between terminals 7 and 5 of chip 74. A 68 ohm resistor 119 is preferably connected between line 121 and terminal 7 of chip 74. A 30K ohm resistor 104 is preferably connected between $V_{BR}$ line 18 and line 121; resistors 104 and 119 together with capacitor 113 form a filter for the power input terminal 7 of chip 74. A 1.8K resistor 106 and a 3900 pf capacitor 108 provide an RC network connected between terminals 4 and 8 of chip 74 to set the frequency of the inverter. A 2N3904 type transistor 117 is driven by terminal 4 of chip 74. A 560 ohm resistor 115 is connected between the emitter of transistor 117 and terminal 3 of chip 74 for slope compensation to stabilize the supply. The operating frequency of modulator 74 is preferably 100 KHz.

Figure 3B:
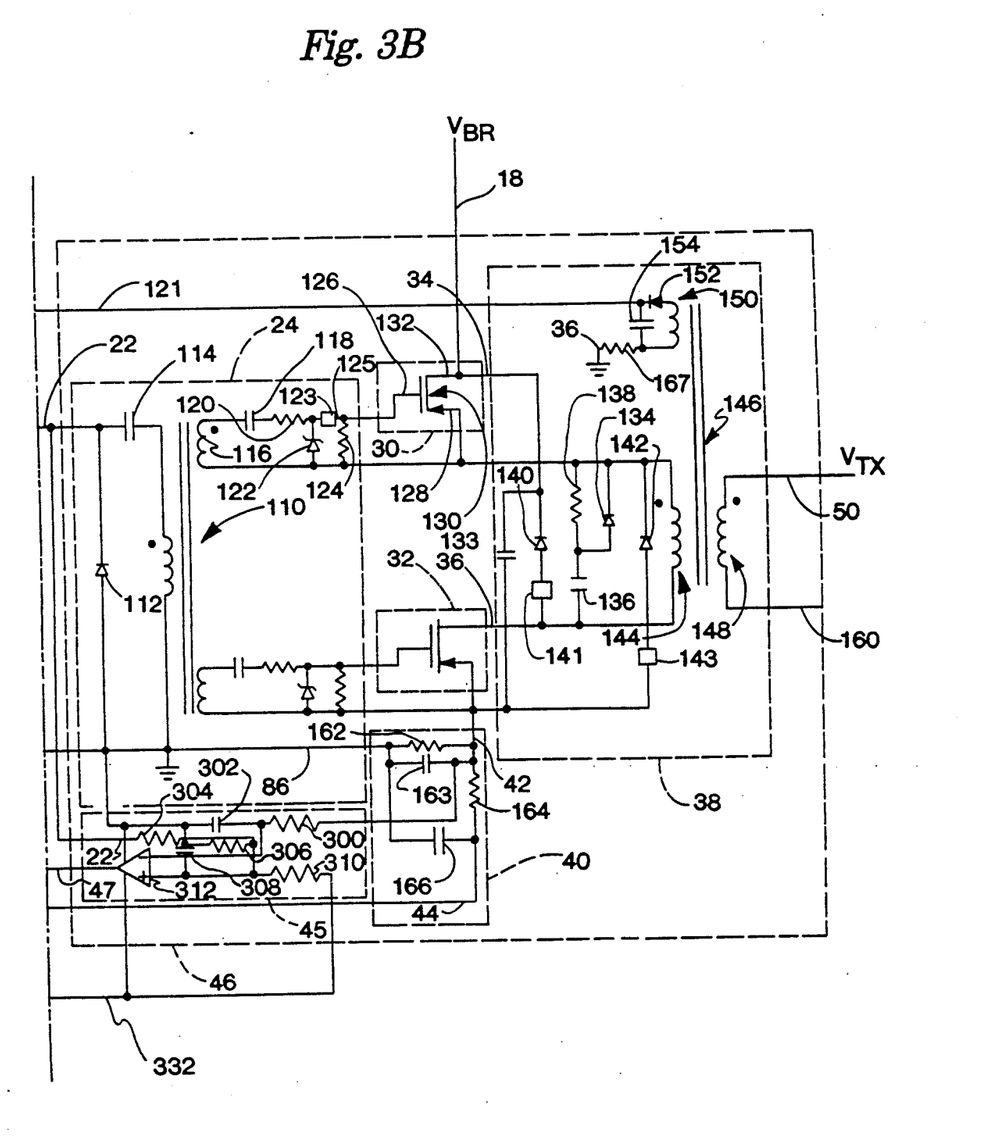
FIG. 3B shows a detailed electrical schematic for the inverter portion of the battery charger utilizing the present invention.

Referring now to FIG. 3B, the details of inverter 46 may be seen. The variable duty cycle pulse-width modulation signal is received on line 22 and coupled to a transformer 110 in gate driver 24 via a 0.22 uf capacitor 114. A 1N5819 diode 112 is connected between line 22 and input circuit common 86 to prevent the output from going negative during turn off. Each of switching devices 30, 32 have identical input and output circuits and hence only one will be described. Transformer 110 has a secondary winding 116 feeding a 0.47 uf capacitor 118 for level shifting and a 22 ohm resistor 120 to reduce overshoot and ringing which would otherwise occur because of the input capacitance of switching transistor 130 and lead inductances. A 15 volt zener diode 122 and a 15K resistor 124 are preferably connected between gate 126 and source 128 of FET transistor 130. Diode 122 clamps the gate-to-source voltage and limits the turn-off signal to 0.6V negative for transistor 130. Resistor 124 provides a path for gate-source bleeder current of transistor 130. A ferrite bead 123, part no. 2644000101 as manufactured by Fair-Rite Product Corp. of Wallkill, N.Y., is preferably placed around conductor 125 to damp ringing. Transistor 130 is preferably a type IRFP450 MOSFET transistor as manufactured by International Rectifier. A snubber network is preferably connected across a primary 144 of an isolation transformer 146. The snubber network is preferably made up of a diode 134, a 3300 pf capacitor 136 and a 450 ohm resistor 138 to slow the rise of the voltage at primary 144 during the off time until all the current has fallen to zero. A 5600 pf capacitor 133 is preferably connected from the drain of transistor 130 to the source of the other transistor 32 for high frequency noise suppression. A pair of diodes 140, 142 are preferably each connected with respective ferrite beads 141, 143 from switching devices 30, 32 to opposite sides of primary 144 of transformer 146 to return leakage energy back to $V_{BR}$ 18 during the off time to improve efficiency and to also reset the core of transformer 146. Transformer 146 further has a secondary 148 with a step-down turns ratio of 35:6 from primary 144 to secondary 148. Transformer 146 has a further winding 150 for a "keep alive" circuit made up of a UF 4002 diode 152, and a 220 uf capacitor 154. A 68 ohm resistor 167 forms a filter with the winding and stray capacitance to prevent ripple currents from flowing into chip 74. The output from transformer 146 is provided to the DC converter 48 (see FIG. 4) on $V_{TX}$ line 50 and load side common 160.

The current feedback circuit 40 is made up of a 0.04 ohm shunt resistor 162 having a 1 uf capacitor 163 connected across it and a low pass filter combination of 100 ohm resistor 164 and a 1500 pf capacitor 166.

The current limit circuit 45 is made up of a 220K resistor 300, a 68 pf capacitor 302, a 10K resistor 304, a 560 ohm resistor 306, a 10 uf capacitor 308, a 12K resistor 310, and an inlegraled circuit comparator 312 which may be one-half of a type LM393 IC, available from National Semiconductor. Circuit 45 is preferably powered from pin 8 of IC74 via line 332.

Figure 4:
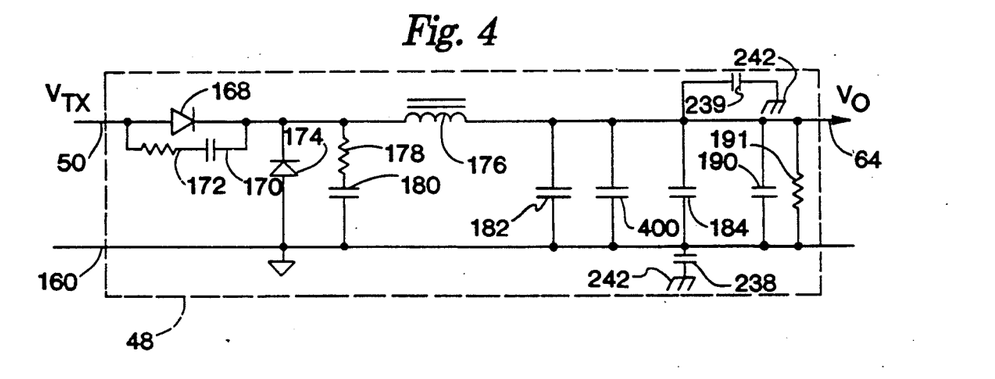
FIG. 4 shows a detailed electrical schematic of the DC converter portion of the battery charger utilizing the present invention.

Referring now to FIG. 4, the circuit details of DC converter 48 may be seen. The $V_{TX}$ output power from the inverter on line 50 is supplied through a diode 168 and an RC snubber made up of a 1000 pf capacitor 170 and an 47 ohm resistor 172. A free wheeling diode 174 cooperates with a 14 uH inductor 176. It is to be understood that diodes 168 and 174 may be a single high current-type device or a parallel combination of lower current rated devices. A further snubber circuit is made up of a 47 ohm resistor 178 and a 220 pf capacitor 180. A pair of 2200 uf energy storage capacitors 182, 184 provides energy storage for the DC converter 48, and a 2.4 K ohm resistor 191 acts as a bleeder. A 68 uf capacitor 400 and a 0.2 uf capacitor 190 provide high frequency filtering. A pair of 0.22 uf capacitors 238, 239 are each connected to a mounting stud ground 242 to provide for improved EMI suppression.

Figure 5:
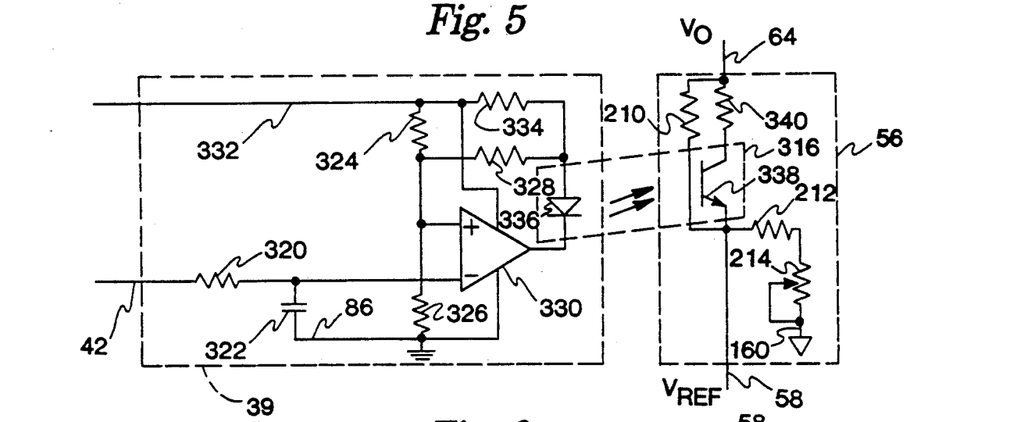
FIG. 5 shows a detailed electrical schematic of the voltage trim and signal isolator portions of the present invention.

Referring now to FIG. 5, the details of current signal isolation means 39 and voltage trim circuit 56 may be seen. Circuit 39 includes a 220 ohm resistor 320, a 10 uf capacitor 322, a 15K resistor 324, a 33 ohm resistor 326, a 33K resistor 328, a comparator 330 (which may be one-half of a type LM393) and a 3K resistor 334. Circuit 39 is preferably powered from pin 8 of IC 74 via line 332. Isolation is provided between circuit 39 (which is referenced to input circuit common 86) and circuit 56 (which is referenced to output circuit common 160) by a type Hl1Alopto-isolator 316. A light-emitting diode 336 of the opto-isolator 316 is driven by circuit 39 while a light-activated transistor 338 of isolator 316 is active in voltage trim circuit 56. The voltage trim circuit 39 is further made up of a 150K resistor 340, a 6.2K resistor 210, a 1.2K resistor 212 and a 1K trim potentiometer 214.

Referring now to FIG. 6, the details of the error detection and correction subsystem 60 may be seen. Subsystem or circuit 60 receives the $V_O$ signal 64 and the $V_{REF}$ signal 58. It is to be understood that the output from subsystem 60 is an optically coupled signal 66 transmitted to modulator 20 (see FIG. 3A). Circuit 60 includes a 200 ohm resistor 216, 1K resistor 218, a 0.1 uf capacitor 224 and 0.001 uf capacitor 226. Circuit 60 includes the diode portion 230 of opto isolator 68. A type TL431 reference amplifier 232 as manufactured by Motorola maintains 2.5 volts on line 58 by closed loop control of the system by regulating the excitation of diode 230 through line 234.

The operation of charger 10 is as follows: Transistor 94, resistor 96 and capacitor 98 function as a "soft start" circuit. Initially transistor 94 clamps terminal 1 of chip 74 to input circuit common 86, and gradually "releases" terminal 1, allowing the pulse width generated by chip 74 to slowly widen to its normal operating condition. This "soft start" reduces compenent stress during start up. An "inner" current control loop including modulator 20 controls current in the switching devices 30, 32 and transformer circuit 38 of inverter 46. Chip 74 has an internal error amplifier and reference (not shown) against which the input at terminal 2 is compared. The error amplifier output (at terminal 1 of chip 74) serves as a current reference against which the current feedback at terminal 3 is compared and regulated by chip 74 controlling pulse width, thus controlling the current in switching devices 30, 32 and transformer circuit 38.

Reference amplifier 232 provides an "outer" closed-loop control of output charging voltage 64 by a virtual ground in an op amp (not shown) in reference amplifier 232. The error voltage generated between the inverting and non-inverting inputs is amplified and coupled to pulse width modulator 74 via opto isolator 68. The error signal (now in the form of pulse width modulation) passes through inverter 46 and is converted to a regulated DC output charging voltage by converter 48. More specifically, a two FET inverter 46 operates in a forward current PWM mode with a variable duty cycle. In the current control loop the current flowing through switching devices 30, 32 and transformer circuit 38 is measured by resistor 162 in current feedback circuit 40 and supplied to terminal 3 of PWM chip 74 in modulator circuit 20. The voltage loop error amplifier output at terminal 1 of chip 74 acts as a current reference and the duty cycle on line 22 is varied to supply the output charging current necessary to support the output charging voltage $V_O$ called-for on line 64.

Potentiometer 214 (see FIG. 5), together with resistors 210 and 212 is used to set the voltage on line 64 without resistor 340 being switched in via transistor 338. The voltage on line 64 in this condition is preferably set to 14.2 volts.

Starting at no load and for very small loads i.e., below three amperes output current, the output of comparator 330 will be in a HI output state, preventing current flow in diode 336. Transistor 338 will remain OFF during this condition. Once output current exceeds 3 amperes, the signal on line 42 will cause comparator 330 to change a LOW output state, turning diode 336 and transistor 338 ON, thereby connecting resistor 340 in parallel with resistor 210 and causing the output voltage to decrease. The output voltage on line 64 is set to 13.6 volts during this condition through the action of the voltage divider network made up of resistors 210, 340, 212 and potentiometer 214. The divided value $V_{REF}$ is provided to reference amplifier 232 via line 58. Amplifier 232 provides an output voltage error signal through opto-isolator 68 to modulator 20 to ultimately control $V_o$ on line 64.

Comparator 330 has a small amount of positive feedback via resistor 328 causing hysteresis or offset between the levels at which output voltage is shifted. For example, with increasing charging current, the output voltage shifts at 3 amperes, while with decreasing charging current the output voltage shifts at 2 amperes, as illustrated in FIG. 2. It is to be understood that the amount of hysteresis can be adjusted by varying the value of resistor 328. The shift point for increasing current is set by the voltage divider of resistors 324 and 326.

Referring now again to FIGS. 3A and 3B, the operation of the current limit circuit 45 is as follows. The output of comparator 312 is connected via line 47 to the base of transistor 94. With the non-inverting input positive with respect to the inverting input, comparator 312 will be OFF, the comparator output being an open collector of an NPN transistor with the emitter connected to the comparator negative power input lead internally (comparator ground) on lead 86. In this state, comparator 312 has no effect on transistor 94. When the inverting comparator input is driven positive with respect to the non-inverting comparator input, the comparator output transistor will turn ON (conducting current from collector to ground) and this will reduce the voltage on the base of the soft start transistor, and consequently reduce the voltage at pin 1 of IC 74, thus causing the pulse output width to narrow, and in turn causing the output current to drop.

The non-inverting input of comparator 312 is used as the reference input, established by the network of resistors 304, 310 and 306. Resistor 310 connects to a fixed reference voltage of nominal value 5 volts, available at pin 8 of the IC 74. This provides a fixed portion of a reference voltage for comparator 312. Resistor 304 connects to the modulator pulse output (pin 6 of IC 74) and supplies a portion of the current limit reference which varies with pulse output width. Capacitor 308 provides the time average integration in cooperation with resistors 304, 306 as well as smoothing any noise which may be present. Resistor 306 divides the reference voltage to a convenient value in cooperation with resistors 304, 310. At very low charging currents, the pulse output width is very small. As current rises, the pulse output width on line 22 widens, increasing the contribution from line 22 to the non-inverting input of comparator 312. When the desired current limit is reached, the ratio of contributions will establish the amount of foldback, approximately 50% in the preferred embodiment.

The inverting or negative input of comparator 312 is connected through resistor 300 to the current feedback signal on line 42, which develops a voltage proportional to primary current, and thus also substantially proportional to output current. Resistor 300 and capacitor 302 form an RC filter to prevent high frequency noise from reaching comparator 312. It is to be understood that the time constant of resistor 300 and capacitor 302 must be short compared to the pulse output width.

Excessive output current (beyond rating) causes excessive primary current, producing a voltage across the current sense resistor 162 sufficient to cause comparator 312 to turn ON, pulling down the voltage on capacitor 98 causing the voltage at pin 1 of IC 74 to fall, reducing the current regulation point, narrowing the pulse output width on line 22, which in turn will reduce the voltage at the non-inverting input of comparator 312, initiating foldback. The current limit circuit described herein is self-resetting, in that once the current overload is removed or reduced to a full-load value or less, the current limit circuit 45 will return to a quiescent state where the output of comparator 312 will turn OFF or go to an open collector condition. With comparator 312 OFF, transistor 94 will turn OFF, allowing the voltage at pin 1 of IC 74 to rise, restarting normal PWM operation of IC 74. It is to be understood that the current limiting foldback is a "soft" transition, i.e., it does not inherently "snap" or move quickly to the reduced current level for a low impedance load (such as a short circuit). Because the pulse width is an indicator of load impedance when charger 10 is operating in a current limiting mode, and the current reference for circuit 45 is based in part on pulse width, the output current will be reduced as the load impedance drops, until the current is limited to approximately 50% of its rated maximum value when a short circuit exists across the output (between lines 64 and 160).

The invention is not to be taken as limited to all of the details thereof as modifications and variations thereof may be made without departing from the spirit or scope of the invention. For example, it is within the scope of this invention to vary the predetermined values or transition points of charging current from 3 and 2 amperes.

What is claimed is:

1. In a battery charger of the type having an output charging voltage which remains substantially constant over a relatively wide output charging current range, the improvement in combination therewith comprising voltage trim means for step-wise increasing the output charging voltage when the output charging current decreases below a predetermined value.

2. The improved battery charger of claim 1 wherein the battery charger is a transformer-coupled pulse-width modulator type having an output charging current on a secondary side of the transformer responsive to a variable duty cycle of the pulse-width modulator and wherein the voltage trim means comprises integrating means for time-average integrating a signal on a primary side of the transformer representative of output charging current and further wherein the voltage trim means comprises sensing means for providing a signal responsive to the time-averaged integral to provide a voltage trim signal increasing the output charging voltage when the output charging current is below the predetermined value.

3. The improved battery charger of claim 2 wherein the signal responsive to the duty cycle integral is a two-state signal.

4. The improved battery charger of claim 2 wherein the sensing means comprises a comparator.

5. The improved battery charger of claim 2 wherein the integrating means comprises a resistive-capacitive network connected to time-average integrate the duty cycle.

6. The improved battery charger of claim 1 wherein the predetermined value of output charging current is 2 amperes.

7. The improved battery charger of claim 6 wherein the output charging voltage steps from 13.6 volts to 14.2 volts as the output charging current decreases below 2 amperes.

8. The improved battery charger of claim 7 wherein the output charging voltage remains substantially at 14.2 volts when the output charging current is below 2 amperes.

9. The improved battery charger of claim 1 wherein the voltage trim means further comprises hysteresis means for decreasing the output charging voltage when the output charging current increases above an offset value above the predetermined value of output charging current.

10. The improved battery charger of claim 9 further comprising means for holding the output charging voltage constant when the output charging current is above the offset value.

11. The improved battery charger of claim 9 further comprising means for holding the output charging voltage at 13.6 volts when the output charging current is above 3 amperes.

12. The improved battery charger of claim 2 wherein the improvement further comprises current limit means for driving the pulse-width modulator to a predetermined reduced primary current when the output charging current called for is above the predetermined full load value.

13. An improved method of operating a lead-acid-battery charger of the type having a pulse-width modulator producing an output charging current from a transformer coupled DC converter at a first level of charging voltage wherein the output charging current is responsive to a duty cycle of the pulse width modulator, the method comprising the steps of:
  a) time-average integrating a primary current to provide a signal proportional to and isolated from the output charging current; and
  b) increasing a charging voltage from the first level to a second level higher than the first level when then time-average integral of the primary current indicates the output charging current is in a range below a predetermined value.

14. The method of claim 13 wherein step b) further comprises stepping up the charging voltage as the output charging current drops below the predetermined value of output charging current.

15. The method of claim 14 wherein the predetermined value of output charging current comprises a first predetermined level and the method further comprises:
  (c) holding the charging voltage constant at the second level when the charging current varies in a range of output charging current below the predetermined value 16. The method of 13 wherein the predetermined value of output current is 2 amperes.

17. The method of claim 16 wherein the range is between 0 and 2 amperes.

18. The method of claim 13 further comprising:
  d) stepping the charging voltage down to the first level only when the output charging current increases above an offset value above the predetermined value of output charging current.

19. The method of claim 18 further comprising:
  e) holding the charging constant at the first level when the output charging current is above the offset value of output charging current.

20. An improved charging voltage trim circuit for use in a battery charger of the type having an isolation transformer coupled modulator providing charging voltage and current at an output terminal in response to a primary side variable duty cycle current control, the trim circuit comprising:
  a) a resistive voltage divider feedback network connected to the output terminal to provide a voltage proportional to the output charging voltage;
  b) optically-coupled switch means for switching between one of two ratios for the voltage divider feedback network;
  c) time-average integrating means for providing a running time-averaged integral value of a primary side current; and
  d) comparator means for comparing the time-averaged integral value with a predetermined value at the primary side of the isolation transformer and for driving the optically-coupled switch means at the secondary side of the isolation transformer to select:
i) a first ratio for the voltage divider above the predetermined value, and
ii) a second ratio for the voltage divider below the predetermined value such that the output charging voltage of the battery charger is controlled to a first value when the first ratio is selected and to a second value when the second ratio is selected.

21. A method of operating a current limiting control loop to limit output charging current in a battery charger of the type having a variable duty cycle modulator providing the output charging current via an isolation transformer, the method comprising connecting the current limit loop reference to both a fixed command signal and an output of the duty cycle modulator such that the level at which current is limited is determined in part by the duty cycle of the modulator.

22. The method of claim 21 wherein the duty cycle of the modulator is determined at least in part by the load impedance when the current limiting control loop of the battery charger is operating.

* * * * *

UNITED STATES PATENT AND TRADEMARK OFFICE
CERTIFICATE OF CORRECTION

PATENT NO. : 5,192,905

DATED : March 9, 1993

INVENTOR(S) : Richard A. Karlin and Hussein I. Bittar

It is certified that error appears in the above-identified patent and that said Letters Patent is hereby corrected as shown below:

Column 10, Line 38, Claim 15, after "value" insert -- . --.

Column 10, Line 39, Claim 16, after "of" insert -- claim --.

Column 10, Line 40, Claim 16, after "output" insert -- charging --.

Column 10, Line 49, Claim 19, after "charging" insert -- voltage --.

Signed and Sealed this

Twenty-first Day of December, 1993

Attest:

BRUCE LEHMAN

Attesting Officer

Commissioner of Patents and Trademarks